(12) United States Patent
Ooba (10) Patent No.: US 10,377,581 B2
(45) Date of Patent: Aug. 13, 2019

(54) ARTICLE CONVEYING DEVICE USING AT LEAST ONE SENSOR

(71) Applicant: FANUC CORPORATION, Yamanashi (JP)

(72) Inventor: Masafumi Ooba, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/875,072

(22) Filed: Jan. 19, 2018

(65) Prior Publication Data
US 2018/0215555 A1   Aug. 2, 2018

(30) Foreign Application Priority Data
Jan. 30, 2017 (JP) .................. 2017-014364

(51) Int. Cl.
| | |
|---|---|
| B65G 47/90 | (2006.01) |
| G06T 7/70 | (2017.01) |
| B65G 17/32 | (2006.01) |
| B65G 43/08 | (2006.01) |

(Continued)

(52) U.S. Cl.
CPC .......... B65G 47/90 (2013.01); B65G 17/323 (2013.01); B65G 43/08 (2013.01); G01C 11/02 (2013.01); G06T 7/70 (2017.01); B65G 47/914 (2013.01); B65G 2203/0225 (2013.01); B65G 2203/0233 (2013.01); B65G 2203/041 (2013.01)

(58) Field of Classification Search
CPC .. B65G 7/14; B65G 47/90; B65G 2203/0233; B65G 2203/025; B65G 2203/0225
USPC ............................. 198/340; 414/222.02
See application file for complete search history.

(56) References Cited

U.S. PATENT DOCUMENTS

| | | | |
|---|---|---|---|
| 8,233,668 B2 * | 7/2012 | Jing ........................ | G06K 9/342 |
| | | | 382/110 |
| 8,295,980 B2 * | 10/2012 | Williamson ............ | B25J 9/026 |
| | | | 414/222.02 |
| 9,283,680 B2 | 3/2016 | Yasuda et al. | |

(Continued)

FOREIGN PATENT DOCUMENTS

| | | |
|---|---|---|
| EP | 2233400 A1 | 9/2010 |
| JP | H08-063214 A | 3/1996 |

(Continued)

*Primary Examiner* — Gene O Crawford
*Assistant Examiner* — Lester Rushin, III
(74) *Attorney, Agent, or Firm* — RatnerPrestia (57) ABSTRACT

An article conveying device, capable of selecting and taking out an appropriate article, even when plural articles are conveyed while overlapping each other. The device has: a supplying section for conveying articles; a position/orientation detecting section for detecting 3-D position/orientation of the article on the supplying section; a movement amount detecting section for detecting an amount of movement of the supplying section; a working section for taking out the article while following a conveying motion of the supplying section, based on the detected 3-D position/orientation and based on the detected amount of movement; and an article selecting section for, when the articles are conveyed while being overlapped with each other, selecting an article to be taken out, on which another article is not overlapped on the object in a determined take-out direction, and outputting a command to the working section for taking out the selected article.

7 Claims, 5 Drawing Sheets

(51) Int. Cl.
*G01C 11/02* (2006.01)
*B65G 47/91* (2006.01)

(56) References Cited

U.S. PATENT DOCUMENTS

| | | |
|---|---|---|
| 9,746,855 B2 | 8/2017 | Kobayashi et al. |
| 2005/0075752 A1 | 4/2005 | Ban et al. |
| 2005/0241494 A1 | 11/2005 | Davi et al. |
| 2015/0151430 A1 | 6/2015 | Koyanagi et al. |
| 2018/0009105 A1* | 1/2018 | Kutsukake ............. B25J 9/0084 |

FOREIGN PATENT DOCUMENTS

| | | |
|---|---|---|
| JP | H08323669 A | 12/1996 |
| JP | 2002037441 A | 2/2002 |
| JP | 3314890 B | 6/2002 |
| JP | 2003211096 A | 7/2003 |
| JP | 2004-001122 A | 1/2004 |
| JP | 2005111607 A | 4/2005 |
| JP | 2005161486 A | 6/2005 |
| JP | 2010006590 A | 1/2010 |
| JP | 2013-000854 A | 1/2013 |
| JP | 2013215833 A | 10/2013 |
| JP | 2014046433 A | 3/2014 |
| JP | 2014104524 A | 6/2014 |
| JP | 2014237188 A | 12/2014 |
| JP | 2015184892 A | 10/2015 |
| JP | 2016-107349 A | 6/2016 |
| WO | 2014013607 A1 | 1/2014 |

* cited by examiner

ARTICLE CONVEYING DEVICE USING AT LEAST ONE SENSOR

CROSS-REFERENCE TO RELATED APPLICATIONS

This application is a new U.S. Patent Application that claims benefit of Japanese Patent Application No. 2017-014364, filed Jan. 30, 2017, the disclosure of this application is being incorporated herein by reference in its entirety for all purposes.

BACKGROUND OF THE INVENTION

1. Field of the Invention

The present invention relates to an article conveying device using at least one sensor.

2. Description of the Related Art

In a conventional conveying system, a plurality of articles conveyed by a conveyor are detected by a vision sensor, and a robot grips and moves each article based on positional information of the detected article while following the motion of the conveyor (e.g., as described in JP H08-063214 A). Also, a technique for preventing an error in picking up an article conveyed by a conveyor is well-known (e.g., as described in JP 2013-000854 A).

Further, a technique for appropriately controlling or correcting the motion of picking up an article on a conveyor, even when the position or orientation of the article on the conveyor has been changed, is well-known (e.g., as described in JP 2004-001122 A or JP 2016-107349 A).

In case that a plurality of articles are conveyed while overlapping each other, it is necessary to use a dedicated device in order to reposition the overlapped articles before picking up an article, whereby a system including the device may be costly. Further, even when the dedicated device is used, it may be difficult to completely reposition the overlapped article when the articles are irregularly supplied or conveyed. In such a case, the overlapped article may not be detected by a vision sensor, and the undetected article may not be conveyed to a predetermined destination, whereby a capacity of the conveying system may be reduced.

SUMMARY OF THE INVENTION

One aspect of the present disclosure provides an article conveying device comprising: a supplying section configured to convey a plurality of articles; at least one position/orientation detecting section configured to detect a three-dimensional position/orientation of the article on the supplying section; a movement amount detecting section configured to detect an amount of movement of the supplying section; at least one working section configured to take out the article while following a conveying motion of the supplying section, and based on the three-dimensional position/orientation of the article detected by the position/orientation detecting section and based on the amount of movement of the supplying section detected by the movement amount detecting section; and an article selecting section configured to, when the articles are conveyed while being overlapped with each other, select an article among the articles as an object to be taken out, on which another article is not overlapped on the object in a take-out direction determined for each of the articles, based on the three-dimensional position/orientation of the article detected by the position/orientation detecting section, and output a command to the working section for taking out the object to be taken out.

BRIEF DESCRIPTION OF THE DRAWINGS

The above and other objects, features and advantages of the present invention will be made more apparent by the following description, of the preferred embodiments thereof, with reference to the accompanying drawings wherein.

DETAILED DESCRIPTIONS

Figure 1:
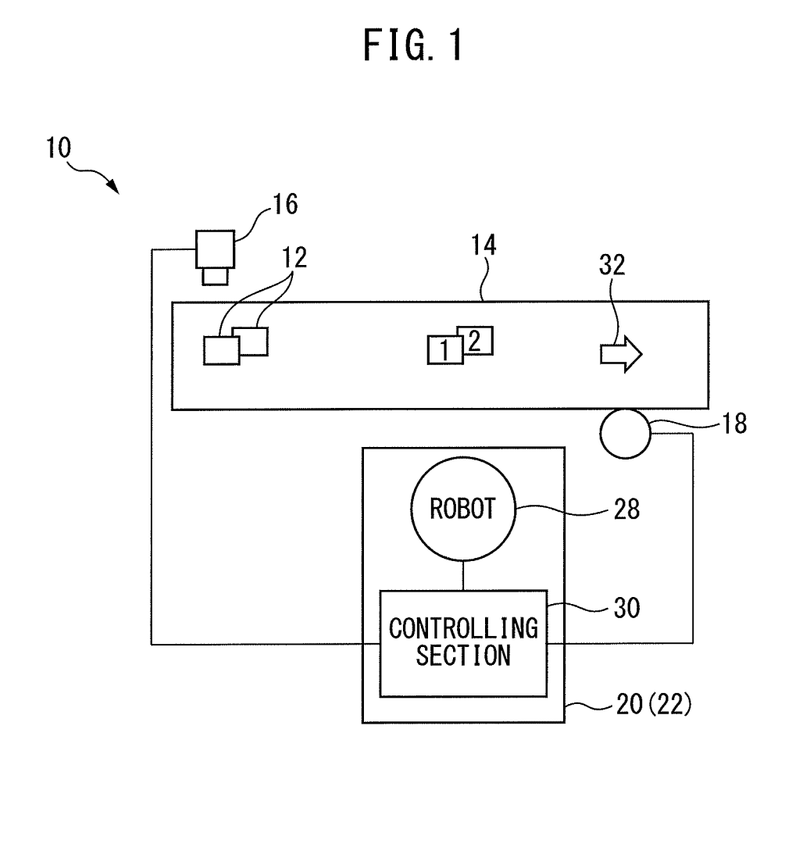
FIG. 1 is a view showing a schematic configuration of an article conveying device according to a first embodiment.
Figure 2:
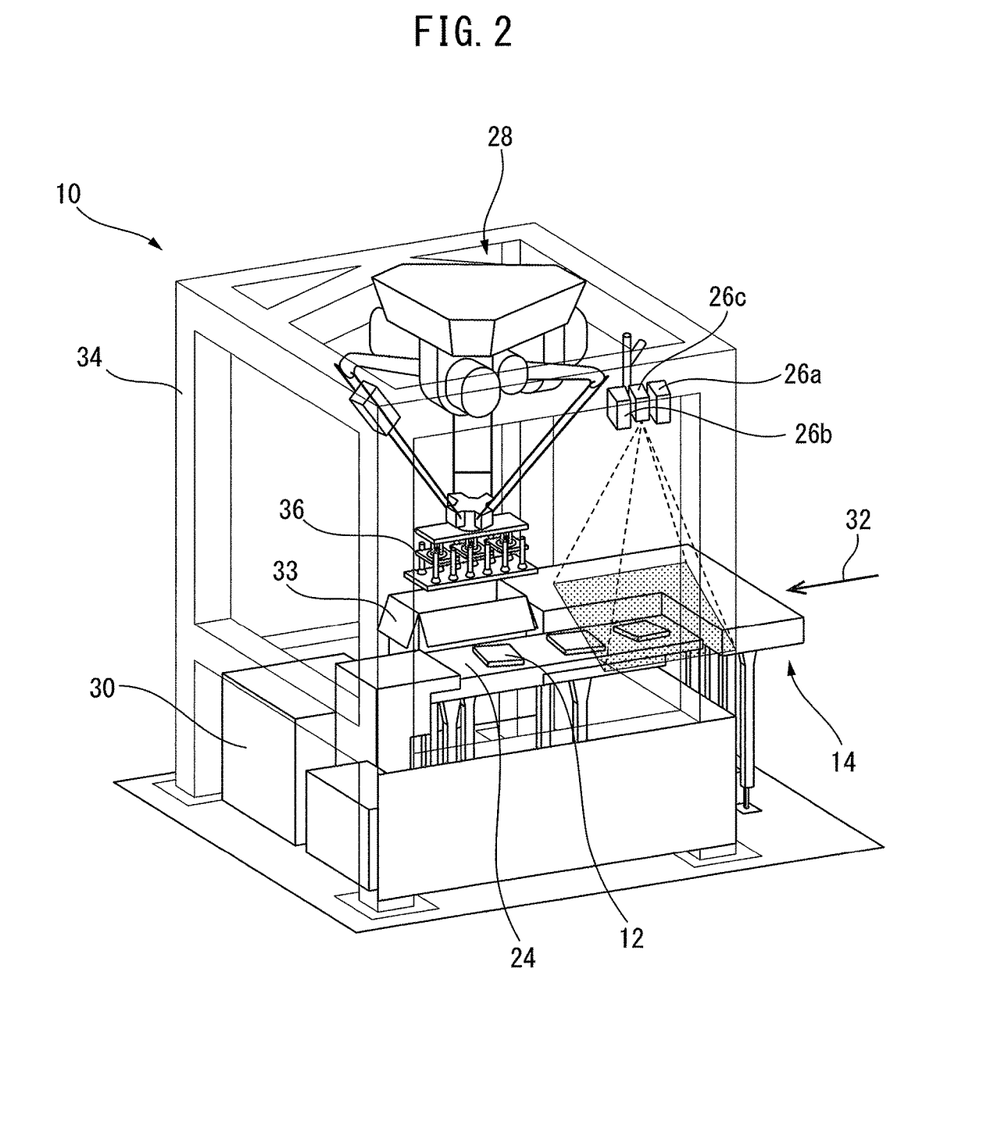
FIG. 2 is a perspective view showing an example of a structure of the article conveying device of FIG. 1.

FIG. 1 shows a schematic configuration of an article conveying device 10 according to a first embodiment, and FIG. 2 is a perspective view showing an example of a structure of article conveying device 10 of FIG. 1. Article conveying device 10 has: a supplying section 14 configured to convey a plurality of articles (workpieces) 12; at least one position/orientation detecting section 16 configured to detect a three-dimensional position/orientation of workpiece 12 on supplying section 12; a movement amount detecting section 18 configured to detect an amount of movement of supplying section 14; at least one working section 20 configured to take out workpiece 12 while following a conveying motion of supplying section 14, based on the three-dimensional position/orientation of workpiece 12 detected by position/orientation detecting section 16 and based on the amount of movement of supplying section 14 detected by movement amount detecting section 18; and an article selecting section 22 configured to, when workpieces 12 are conveyed while being overlapped with each other, select a workpiece to be taken out among workpieces 12, and output a command to working section 20 for taking out the selected workpiece.

For example, supplying section 14 is a conveyor such as a belt conveyor, and has a conveying member 24 on which workpieces 12 can be located, and a drive mechanism (not shown) such as an electric motor configured to drive conveying member 24 so that workpieces 12 are moved in one direction (from left to right in FIG. 1, or from right to left in FIG. 2).

A structure of position/orientation detecting section 16 is not limited particularly. For example, and an arbitrary sensor using a conventional principle, such as a space code sensor, a random dot pattern sensor, a time of flight (TOF) sensor, a light section sensor, or a stereo camera sensor, may be used as position/orientation detecting section 16. Further, an output form of the three-dimensional information (e.g., the three-dimensional position/orientation) from the sensor is not limited particularly. In the example of FIG. 2, position/ orientation detecting section 16 is a 3-D sensor constituted by two 2-D cameras 26a and 26b, and a projector 26c. In addition, article conveying device 10 may have an image processor (not shown) for carrying out the image processing, and a function of the image processor may be incorporated in a controller 30 as explained below, or may be realized as another processing unit such as a personal computer.

Herein, the term "position/orientation" means the position and orientation of the workpiece. In this regard, when the workpiece has a spherical or circular shape and it is not necessary to consider the orientation of the workpiece in order to take out the workpiece, the term "position/orientation" may mean the position only.

For example, movement amount detecting section 18 is an encoder configured to detect an amount of movement (or a movement velocity) of workpiece 12 on conveyor 14, by detecting a rotational velocity of a belt of conveyor 14 or a rotational velocity of the electric motor for driving the belt, etc. Alternatively, a commanded velocity or a commanded amount of movement included in a drive command for conveyor 14 may be used as the amount of movement.

For example, working section 20 has a working machine 28 positioned at or near a lateral side of conveyor 14, and a controller 30 for controlling working machine 28, and is configured to take out (or pick up) at least one workpiece 12 on conveyor 14 and convey the workpiece to a predetermined destination (e.g., a box 33 as shown in FIG. 2). For example, working machine 28 may be a robot such as a parallel link robot or a multi-joint robot, having a suction type or grip type robot hand. In the example of FIG. 2, one parallel link robot (working machine) 28 is fixed to a pedestal 34, and the robot has a hand 36 configured to suck (at most three at the same time) workpiece(s) having a generally flat shape (e.g., a pouch including a fluid therein).

For example, article selecting section 22 may be realized as a processor, etc., incorporated in controller 30 or another device such as a personal computer. Article selecting section 22 is configured to select, when workpieces 12 are conveyed while being overlapped with each other, select a workpiece among workpieces 12 as an object to be taken out, on which another workpiece is not overlapped on the object in a take-out direction determined for each of workpieces 12, based on the three-dimensional position/orientation of workpiece 12 detected by position/orientation detecting section 16, and output a command to working section 20 for taking out the object to be taken out. Hereinafter, an example of the procedure therefor will be explained with reference to FIGS. 3 and 4.

Figure 3:
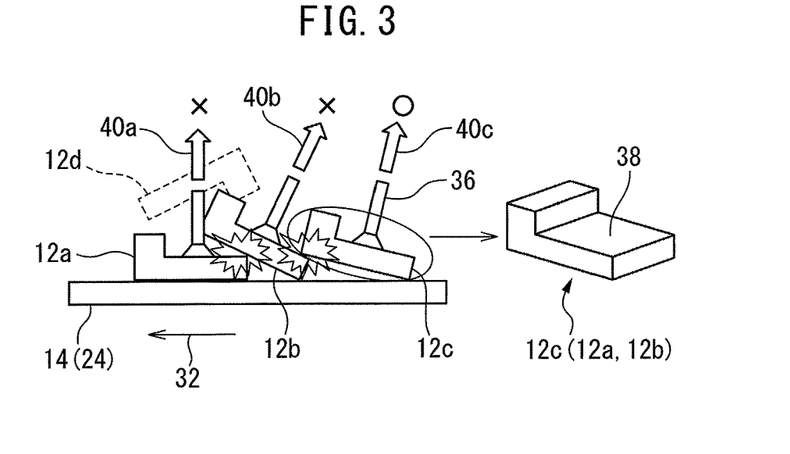
FIG. 3 is a schematic view showing an example of a state in which a plurality of articles are overlapped with each other, and a take-out direction of each of the articles.
Figure 4:
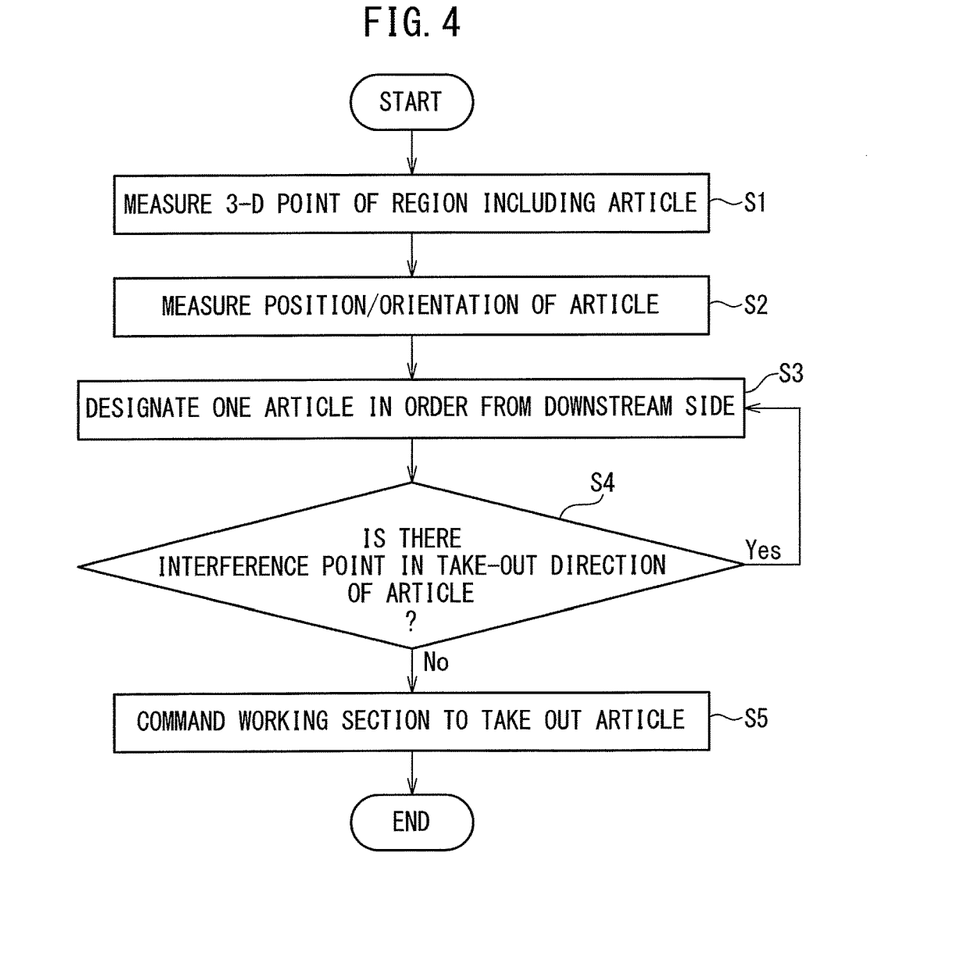
FIG. 4 is a flowchart exemplifying a procedure for selecting an article to be taken out in the article conveying device of FIG. 1.

In the example, as shown in FIG. 3, three workpieces 12a, 12b and 12c are conveyed by conveyor 14 while being overlapped with each other. First, in step S1, three-dimensional points of a region including workpieces (articles) 12a to 12c are measured by three-dimensional sensor 16. Then, in step S2, the three-dimensional position/orientation of each workpiece is calculated.

As a method for calculating the three-dimensional position/orientation of the workpiece, a conventional method such as a matching, in which a shape of each workpiece to be imaged is previously stored as a 3-D model, etc., and then the shape of the workpiece is predicted based on the stored shape and a result of imaging, may be used. In the matching, when a workpiece is partially visible in the image obtained by the camera (i.e., another workpiece is overlapped on the workpiece), the overall shape of the workpiece is predicted based on the shape of the visible (partial) portion of the workpiece. In this regard, a ratio of the visible portion to the entire workpiece can be calculated as an evaluation value.

When the evaluation value is lower than a predetermined threshold, article selecting section 22 may exclude the corresponding workpiece from the object to be taken out, before a procedure as explained below. For example, the ratio of the visible portion to the entire workpiece is lower than 20%, it is apparent that the corresponding workpiece is inappropriate as the object to be taken out. Therefore, in such a case, by excluding the workpiece from the object to be taken out without executing the procedure as described below, a calculation time can be reduced. This may be also applicable to embodiments as explained below.

In the next step S3, among workpieces 12a to 12c, the three-dimensional positions/orientations of which have been detected, a workpiece (in the example of FIG. 3, workpiece 12a) positioned at the lowermost streamside with respect to a conveying direction 32 of conveyor 14 is designated. Although step 3 is not essential, the possibility that the workpiece is conveyed to the downstream side beyond a working area (or a movable range) of robot 28 can be reduced, by sequentially judging as to whether or not the workpieces can be taken out in order from the downstream side to the upstream side. This is also applicable to embodiments as explained below.

In the next step S4, with respect to the designated workpiece, it is judged as to whether or not a three-dimensional measurement point of another workpiece (or an interference article) exists in the take-out direction of the designated workpiece. In other words, it is detected as to whether or not another workpiece is overlapped on the designated workpiece when viewed in the take-out direction of the designated workpiece. In this regard, the "measurement point" means a representative point representing an outline or shape feature of the workpiece, which can be used in the matching, etc. Therefore, when one or some of the measurement points of the designated workpiece cannot be detected due to the existence of the other workpiece, it can be judged that the other workpiece is overlapped on the designated workpiece.

The "take-out direction" means a movement direction of the article (workpiece) immediately after being held by robot hand 36, etc. In other words, the take-out direction corresponds to the movement direction of the held article (or the hand) when the article is moved away from the conveyor. In the example of FIG. 3, each of workpieces 12a to 12c has an adsorbed surface 38 to which hand 36 can be adsorbed, and hand 36 is configured to take out or pick up the workpiece while adsorbing to adsorbed surface thereof, in the direction perpendicular to adsorbed surface 38. Therefore, the take-out directions of workpieces 12a, 12b and 12c may be represented by arrows 40a, 40b and 40c, respectively. As such, the take-out direction is not limited to the vertical direction, and may vary depending on the shape or orientation of the workpiece on the conveyor, or a position of the workpiece to be held.

In step S4, since workpiece 12b is overlapped on workpiece 12a in take-out direction 40a, firstly designated workpiece 12a is not selected as the workpiece to be taken out, and then workpiece 12b, positioned at the second lowermost streamside, is designated (step S3). However, since workpiece 12c is overlapped on workpiece 12b in take-out direction 40b, designated workpiece 12b is not selected as the workpiece to be taken out, and then workpiece 12c, positioned at the third lowermost streamside, is designated (step S3). Accordingly, in this example, workpiece 12c is selected as the workpiece to be taken out, since no workpiece is overlapped on workpiece 12c in take-out direction

40c. Then, a command for taking out workpiece 12c is generated and transmitted to working section 20 (or controller 30) (step S5).

In this embodiment, it is detected as to whether or not the workpiece is overlapped on the other workpiece in the take-out direction determined with respect to each workpiece, and thus the optimum workpiece (in many cases, the entire region (or all 3-D points) of the workpiece can be detected when viewed in the take-out direction thereof) can be selected as the workpiece to be taken out. In the prior art, when the overlapped workpieces should be picked up, a workpiece located at the highest position in the vertical direction is usually selected as the workpiece to be taken out. However, it is not always true that the workpiece located at the highest position is appropriate as the workpiece to be taken out, depending on the orientation thereof. For example, although the position of (the gravity center of) workpiece 12b is above workpiece 12c in the vertical direction, workpiece 12b is inappropriate as the workpiece to be taken out, since workpiece 12c is overlapped on workpiece 12b in the take-out direction of workpiece 12b. Further, as shown in FIG. 3, a workpiece 12d, which is located while an adsorbed surface thereof is directed to the downward direction, is also inappropriate as the workpiece to be taken out. However, even in such a case, the workpiece to be taken out can be properly selected according to this embodiment or embodiments as explained below.

Figure 5:
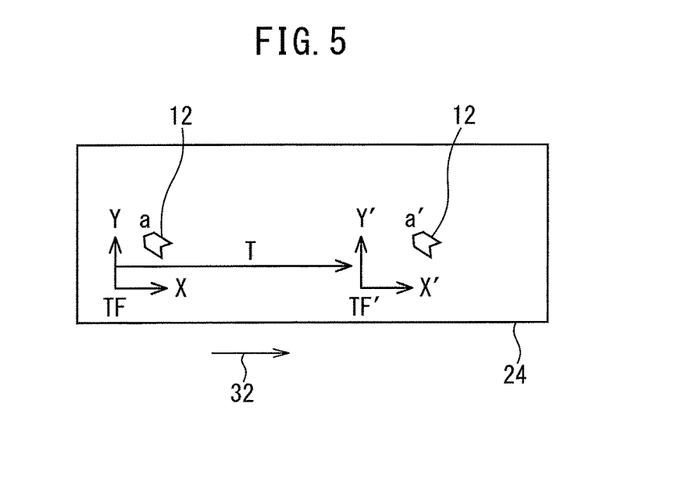
FIG. 5 is a view explaining an example of a tracking method for the article.

FIG. 5 explains an example of a (tracking) method, by which robot 28 can follow the conveying motion of conveyor 14 and grip or hold workpiece 12. First, by using three-dimensional sensor 16, position/orientation "a" of workpiece 12 on a tracking coordinate system TF at a time point t1 is detected. Next, a tracking coordinate system TF' at a time point t2 (when the robot takes out the workpiece) is calculated by using following equation (1), in which "T" represents a coordinate conversion matrix.

$$TF'=T \cdot TF \qquad (1)$$

In this regard, a component of translational movement of "T" can be represented as "(e2−e1)/Scale," wherein "e1" is a count value of encoder 18 at the time of detection (time point t1), and "e2" is a count value of encoder 18 at the present time (time point t2). In addition, "Scale" is a value representing a relationship between the encoder count value and the amount of movement of the conveyor, and may have a unit (count/mm), etc.

By the above procedure, position/orientation "a'" of workpiece 12 on tracking coordinate system TF' at time point t2 can be calculated. Therefore, robot 28 can carry out the predetermined operation while following the motion of workpiece 12, based on tracking coordinate systems TF and TF'. Such a tracking motion can also be applied to embodiments as explained below.

Figure 6:
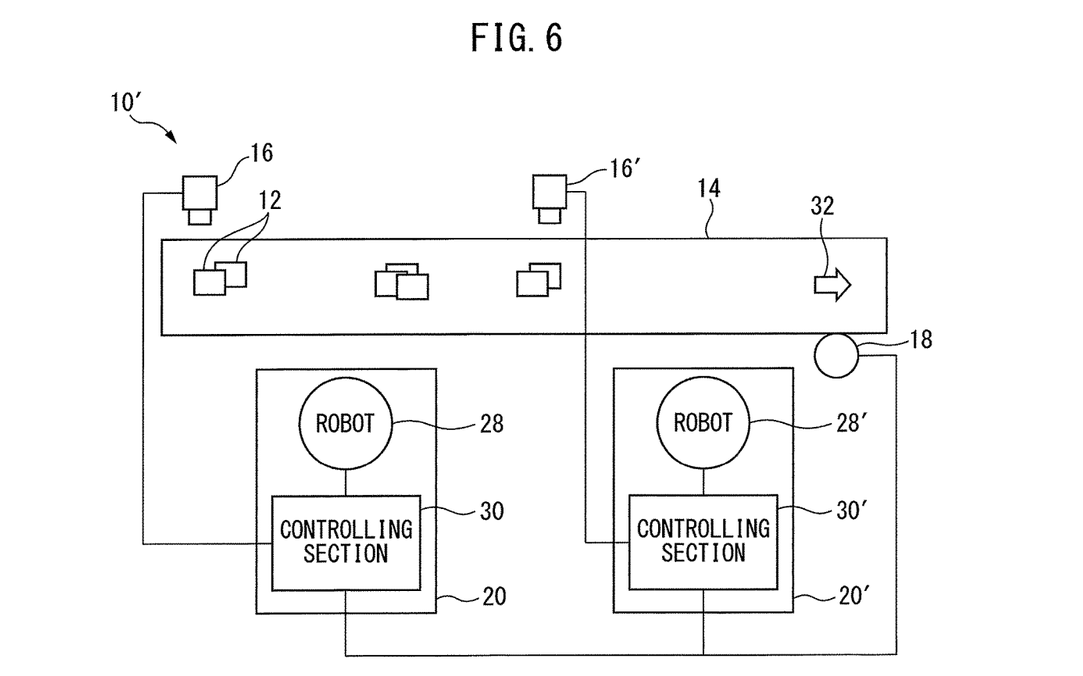
FIG. 6 is a view showing a schematic configuration of an article conveying device according to a second embodiment.

FIG. 6 shows a schematic configuration of an article conveying device 10' according to a second embodiment. In the second embodiment, the same reference numerals are added to the components corresponding to the components of the first embodiment, and detailed explanations thereof will be omitted.

Article conveying device 10' has a plurality of (in the drawing, two) position/orientation detecting sections, and a plurality of (in the drawing, two) working sections. Concretely, conveying device 10' further has a second position/orientation detecting section 16' positioned at the downstream side of first position/orientation detecting section (or three-dimensional sensor) 16 positioned at the uppermost stream side with respect to conveying direction 32 of conveyor 14, and a second working section 20' positioned at the downstream side of first working section 20 with respect to conveying direction 32 of conveyor 14. Similarly to working section 20, working section 20' may have a robot 28' and a controller 30' for controlling robot 28'. However, second working section 20' is not limited to such a configuration, and may have any mechanism as long as the mechanism can take out workpiece 12 within a predetermined working area.

In the second embodiment, position/orientation detecting section 16' and working section 20' are located at the downstream side. Therefore, when three or more workpieces 12 are overlapped with each other on conveyor 14, etc. (in other words, when the three-dimensional position/orientation of one or more workpiece cannot be detected by position/orientation detecting section 16 at the upstream side, or when all of the workpieces cannot be taken out by working section 20), the three-dimensional position/orientation of the remaining workpiece can be detected by position/orientation detecting section 16' at the downstream side, and then the workpiece can be taken out by working section 20'. Accordingly, in the second embodiment, the possibility that all of the workpieces on conveyor 14 can be taken out may be significantly increased.

Although not shown in the drawing, when multiple workpieces are overlapped with each other, the possibility that all of the workpieces on conveyor 14 can be taken out may be further increased, by using three or more position/orientation detecting sections and three or more working sections.

Similarly to position/orientation detecting section 16 at the upstream side, position/orientation detecting section 16' at the downstream side may be a three-dimensional sensor configured to detect the three-dimensional position/orientation of each workpiece. Alternatively, when workpiece 12 has a substantially flat shape such as a pouch as shown in FIG. 2, and when at most two workpieces may be overlapped with each other on conveyor 14 (it is unlike that three or more workpieces are overlapped with each other), at least one of the position/orientation detecting sections other than first position/orientation detecting section 16 may be a two dimensional sensor (e.g., one CCD camera) configured to detect a two dimensional position/orientation of each workpiece. In general, the two-dimensional sensor is less expensive than the three-dimensional sensor, and thus the entire system may be constituted at lower cost by using the two-dimensional sensor.

Figure 7:
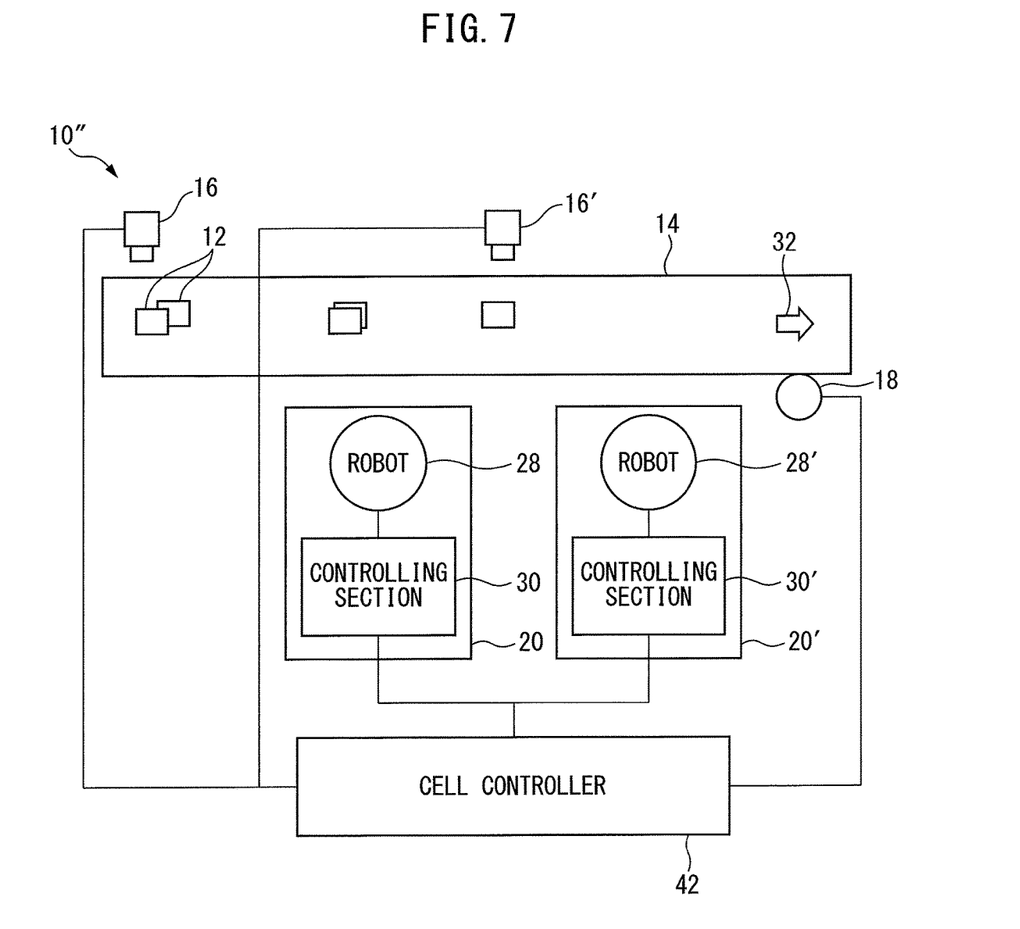
FIG. 7 is a view showing a schematic configuration of an article conveying device according to a third embodiment.

FIG. 7 shows a schematic configuration of an article conveying device 10" according to a third embodiment. In the third embodiment, the same reference numerals are added to the components corresponding to the components of the second embodiment, and detailed explanations thereof will be omitted.

Article conveying device 10" has at least one (preferably, a plurality of) (in the drawing, two) position/orientation detecting sections 16 and 16', and a plurality of (in the drawing, two) working sections 20 and 20'. Further, article conveying device 10" has a cell controller 42 configured to control working sections 20 and 20' (or control sections 30 and 30'). Cell controller 42 may be constituted as an arithmetic processing unit having a relatively high capacity, such as a personal computer or a work station, and is configured to control position/orientation detecting sections 16 and 16', and working sections 20 and 20' (or control sections 30 and 30'), by being communicably connected to each apparatuses.

In the third embodiment, by using cell controller 42, central control of the plurality of working sections and position/orientation detecting sections can be easily carried out. Further, by installing cell controller 42 at a place distant from article conveying device 10", device 10" can be remotely controlled, and an operator distant from device 10" can easily confirm or monitor the state of device 10".

According to the present disclosure, when the plurality of articles are conveyed while overlapping each other, the objective article can be taken out without changing the positions/orientations of the other articles, without using a dedicated device for resolving the overlapping.

While the invention has been described with reference to specific embodiments chosen for the purpose of illustration, it should be apparent that numerous modifications could be made thereto, by one skilled in the art, without departing from the basic concept and scope of the invention.

The invention claimed is:

1. An article conveying device comprising:
a supplying section configured to convey a plurality of articles;
at least one position/orientation detecting section configured to detect a three-dimensional position/orientation of the article on the supplying section;
a movement amount detecting section configured to detect an amount of movement of the supplying section;
at least one working section configured to take out the article while following a conveying motion of the supplying section, and based on the three-dimensional position/orientation of the article detected by the position/orientation detecting section and based on the amount of movement of the supplying section detected by the movement amount detecting section; and
an article selecting section configured to, when the articles are conveyed while being overlapped with each other, select an article among the articles as an object to be taken out, on which another article is not overlapped on the object in a take-out direction determined for each of the articles, based on the three-dimensional position/orientation of the article detected by the position/orientation detecting section, and output a command to the working section for taking out the object to be taken out in the take-out direction, wherein each take-out direction varies depending on a shape of each article and the orientation of each article on the supplying section.

2. The article conveying device as set forth in claim 1, wherein the article conveying device comprises a plurality of the position/orientation detecting sections and a plurality of the working sections,
wherein the three-dimensional position/orientation of the article, which is not detected by a first position/orientation detecting section among the position/orientation detecting sections positioned at an uppermost stream side with respect to a conveying direction of the supplying section, is detected by a second position/orientation detecting section among the position/orientation detecting sections positioned at a downstream side of the first position/orientation detection section, and
wherein the article selecting section is configured to output a command to a second working section among the working sections for taking out the article detected by the second position/orientation detecting section, the second working section being positioned at a downstream side of a first working section positioned at an upstream side with respect to the conveying direction of the supplying section.

3. The article conveying device as set forth in claim 2, wherein at least a third position/orientation detecting section among the position/orientation detecting sections is configured to detect a two-dimensional position/orientation of the article.

4. The article conveying device as set forth in claim 1, wherein the position/orientation detecting section is configured to execute matching for predicting a shape of each article, and the article selecting section is configured to exclude the article, an evaluation value of which obtained by the matching is lower than a predetermined threshold, from the object to be taken out.

5. The article conveying device as set forth in claim 1, wherein the article selecting section is configures to sequentially judge as to whether each of the articles overlapped with each other can be selected as the object to be taken out, in order from the article at the lowermost stream side to the article at the uppermost stream side with respect to the conveying direction of the supplying section.

6. The article conveying device as set forth in claim 1, wherein the article conveying device comprises a plurality of the working sections, and comprises a cell controller configured to control the at least one position/orientation detecting section and the plurality of working sections.

7. The article conveying device as set forth in claim 1,
wherein the article selecting section configured to, when the articles are conveyed while being overlapped with each other:
analyze the articles starting from the furthest downstream on the supplying section,
during the analysis, select an article:
1) that is not overlapped by another article in a take-out direction determined for each of the articles, and
2) where the three-dimensional position/orientation of the article detected by the position/orientation detecting section is a predetermined position/orientation, and
output a command to the working section for taking out the object to be taken out.

* * * * *